US011573747B2

United States Patent
Satyamohan et al.

(10) Patent No.: US 11,573,747 B2
(45) Date of Patent: Feb. 7, 2023

(54) SYSTEMS AND METHODS FOR A PRINTER REVERSE REDIRECTOR

(71) Applicant: FMR LLC, Boston, MA (US)

(72) Inventors: Vivek Satyamohan, Bangalore (IN); Hari Krishna Pola, Bangalore (IN); Syed Muzamil, Bangaluru (IN); Jemkumar Mathew, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/032,953

(22) Filed: Sep. 25, 2020

(65) Prior Publication Data

US 2022/0100439 A1 Mar. 31, 2022

(51) Int. Cl.
*G06F 3/12* (2006.01)
*G06F 9/455* (2018.01)

(52) U.S. Cl.
CPC .......... *G06F 3/1205* (2013.01); *G06F 3/1227* (2013.01); *G06F 3/1231* (2013.01); *G06F 3/1253* (2013.01); *G06F 3/1265* (2013.01); *G06F 3/1288* (2013.01); *G06F 9/45558* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,854,663 B2 | 10/2014 | Jaudon et al. | |
| 8,970,450 B2 | 3/2015 | Momchilov | |
| 9,588,637 B2 | 3/2017 | Momchilov et al. | |
| 2007/0294699 A1* | 12/2007 | Bahl | G06F 21/62 718/104 |
| 2007/0300220 A1* | 12/2007 | Seliger | H04L 67/34 718/1 |
| 2012/0044517 A1* | 2/2012 | Fukasawa | G06F 3/1285 358/1.13 |
| 2012/0092719 A1 | 4/2012 | Jaudon et al. | |
| 2012/0293833 A1* | 11/2012 | Fukasawa | G06F 3/1203 358/1.15 |

(Continued)

FOREIGN PATENT DOCUMENTS

JP 5133430 B2 1/2013

*Primary Examiner* — Fan Zhang
(74) *Attorney, Agent, or Firm* — Cesari & McKenna, LLP

(57) ABSTRACT

Systems and methods for redirecting one or more printers from a virtual computing device to a physical computing device. The method includes initiating a printing application on a virtual computing device and exporting at least one printer configuration. The at least one printer configuration corresponds to one or more printers communicatively coupled to a physical computing device. The method also includes storing the at least one printer configuration to a data file on the virtual computing device and copying the data file from the virtual computing device to the physical computing device. The method further includes invoking the data file on the physical computing device such that the at least one printer configuration is imported on the physical computing device. The method also includes generating for display on the virtual computing device at least one indication of the one or more printers communicatively coupled to the physical computing device.

18 Claims, 5 Drawing Sheets

(56) References Cited

U.S. PATENT DOCUMENTS

| | | | |
|---|---|---|---|
| 2013/0232479 A1* | 9/2013 | Jain | G06F 8/61 |
| | | | 717/174 |
| 2018/0234517 A1* | 8/2018 | Venkatesh | H04L 67/2814 |
| 2020/0159478 A1* | 5/2020 | Uemura | G06F 3/1257 |
| 2020/0379689 A1* | 12/2020 | Arai | G06F 3/1224 |
| 2021/0141579 A1* | 5/2021 | Yuan | G06F 3/121 |

\* cited by examiner

SYSTEMS AND METHODS FOR A PRINTER REVERSE REDIRECTOR

FIELD OF THE INVENTION

The present invention relates generally to systems and methods for redirecting one or more printers on a virtual computing device, including systems and methods for redirecting one or more printers from a virtual computing device to a physical computing device.

BACKGROUND OF THE INVENTION

A virtual machine is an emulation of a computing system that provides the same or similar functionality of a physical computing device. Many organizations provide users with a physical computing device that runs a virtual machine, instead of a local operating system. The virtual machine is often hosted on a server computing device or datacenter, while the users use the virtual machine at remote offices. Users can use the virtual machines to provide services to customers and even print documents at local printers.

However, users at the remote offices often face prolonged print delays due to low bandwidth network connections between the virtual machine and the local printers. Such prolonged print delays can impact user productivity and experience. Modern solutions allow for printer redirection from a physical computing device to a virtual machine, but these solutions do not allow for reverse printer mapping from a virtual machine to a physical machine. Therefore, there is a need to provide optimal print job routing from a virtual machine to a physical machine over the network in order to decrease print delays.

SUMMARY OF THE INVENTION

Accordingly, an object of the invention is to provide systems and methods for redirecting one or more printers on a virtual computing device. It is an object of the invention to provide systems and methods for optimal print job routing from a virtual computing device to a physical computing device. It is an object of the invention to provide systems and methods for compressing print jobs on a virtual computing device and routing the compressed print job to a physical computing device. It is an object of the invention to provide systems and methods for redirecting one or more printers from a virtual computing device to a physical computing device.

In some aspects, a method for redirecting one or more printers from a virtual computing device to a physical computing device includes initiating a printing application on a virtual computing device. The method further includes exporting at least one printer configuration. The at least one printer configuration corresponds to one or more printers communicatively coupled to a physical computing device. The method also includes storing the at least one printer configuration to a data file on the virtual computing device.

The method also includes copying the data file from the virtual computing device to the physical computing device. Further, the method includes invoking the data file on the physical computing device such that the at least one printer configuration is imported on the physical computing device. The method also includes generating for display on the virtual computing device at least one indication of the one or more printers communicatively coupled to the physical computing device.

In some embodiments, the method also includes initiating the printing application on the virtual computing device in response to a user trigger. In other embodiments, the method also includes generating for display on the virtual computing device the at least one indication of the one or more printers using a display protocol. For example, in some embodiments, the display protocol is based on printer policies of the virtual computing device. In other embodiments, the at least one printer configuration includes one or more registry keys corresponding to the one or more printers communicatively coupled to the physical computing device.

In some embodiments, the method further includes receiving a print job corresponding to a printer of the one or more printers communicatively coupled to the physical computing device. For example, in some embodiments, the print job is compressed on the virtual computing device. In some embodiments, the method also includes receiving the compressed print job from the virtual computing device. In some embodiments, the method further includes initiating the compressed print job on the physical computing device using the imported printer configuration. For example, in some embodiments, a printer of the one or more printers communicatively coupled to the physical computing device completes the print job.

In some aspects, a system for redirecting one or more printers from a virtual computing device to a physical computing device includes a virtual computing device communicatively coupled to a physical computing device over a network. The virtual computing device is configured to initiate a printing application on the virtual computing device. The virtual computing device is also configured to export at least one printer configuration. The at least one printer configuration corresponds to one or more printers communicatively coupled to the physical computing device. Further, the virtual computing device is configured to store the at least one printer configuration to a data file on the virtual computing device.

The virtual computing device is also configured to copy the data file from the virtual computing device to the physical computing device. Further, the virtual computing device is configured to invoke the data file on the physical computing device such that the at least one printer configuration is imported on the physical computing device. The virtual computing device is further configured to generate for display on the virtual computing device at least one indication of the one or more printers communicatively coupled to the physical computing device.

In some embodiments, the virtual computing device is also configured to initiate the printing application on the virtual computing device in response to a user trigger. In other embodiments, the virtual computing device is also configured to generate for display on the virtual computing device the at least one indication of the one or more printers using a display protocol. For example, in some embodiments, the display protocol is based on printer policies of the virtual computing device. In other embodiments, the at least one printer configuration includes one or more registry keys corresponding to the one or more printers communicatively coupled to the physical computing device.

In some embodiments, the virtual computing device is further configured to receive a print job corresponding to a printer of the one or more printers communicatively coupled to the physical computing device. For example, in some embodiments, the print job is compressed on the virtual computing device. In some embodiments, the virtual computing device is also configured to deliver the compressed print job from the virtual computing device. In some embodiments, the virtual computing device is further configured to initiate the compressed print job on the physical computing device using the imported printer configuration. For example, in some embodiments, a printer of the one or more printers communicatively coupled to the physical computing device completes the print job.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for redirecting one or more printers on a virtual computing device. The system and methods can include mechanisms or methods for optimal print job routing from a virtual computing device to a physical computing device. The systems and methods described herein can provide systems and methods for compressing print jobs on a virtual computing device and routing the compressed print job to a physical computing device. The systems and methods described herein can include one or more mechanisms or methods for redirecting one or more printers from a virtual computing device to a physical computing device.

Figure 1:
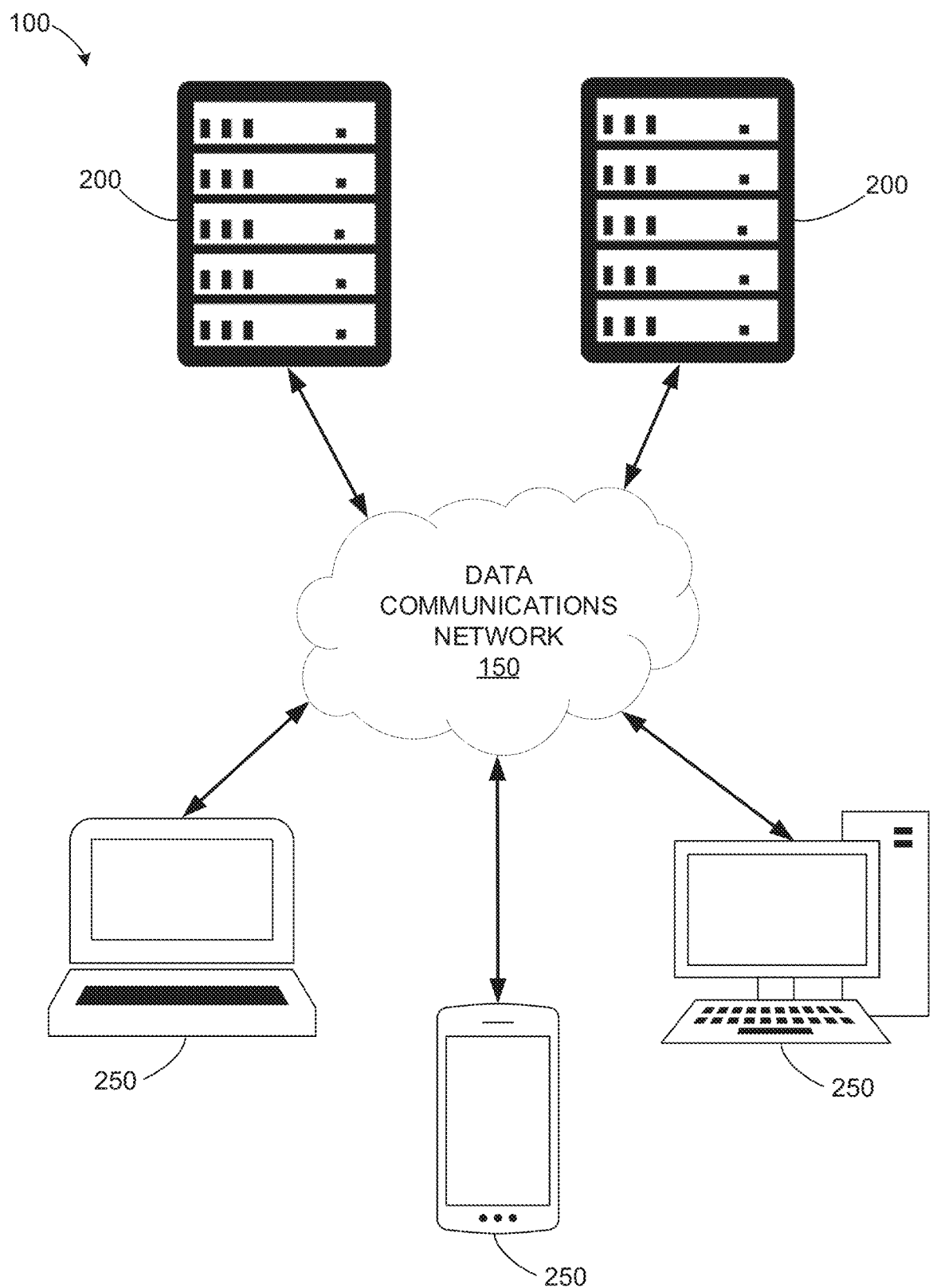
FIG. 1 is a block diagram of an exemplary data communications network, according to embodiments of the technology described herein.
Figure 2:
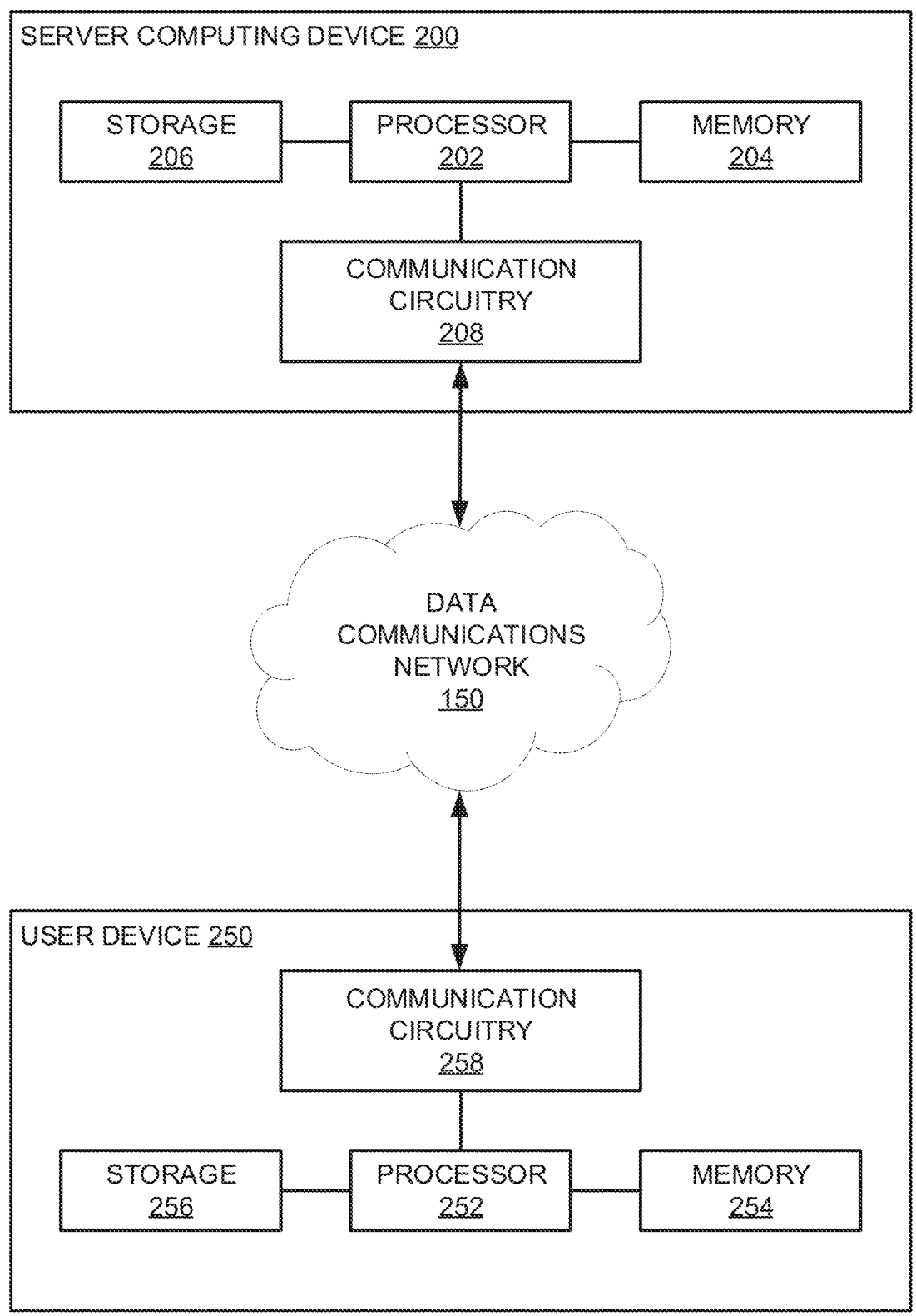
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
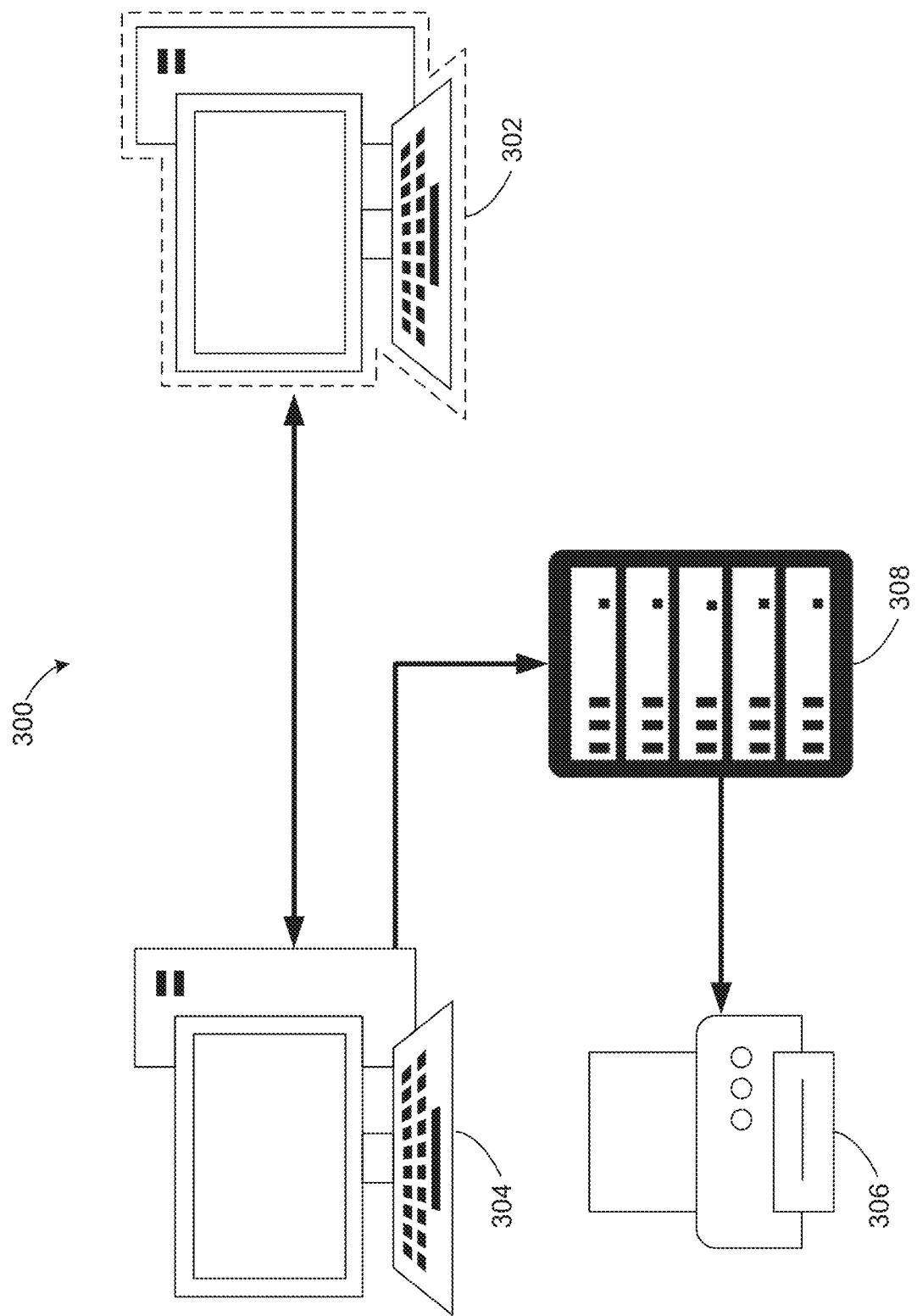
FIG. 3 is a diagram showing a visualization of an exemplary optimized printing architecture, according to embodiments of the technology described herein.

In some aspects, the systems and methods described herein can include one or more mechanisms or methods for replicating all the existing printers available on a virtual machine over to a physical machine through which user is connected. The systems and methods described herein are especially noteworthy in situations when the physical machine is a locked down device (e.g., Windows 10 Lite) because the user does not have permissions to perform any actions. For example, an exemplary optimized printing architecture 300 is illustrated in FIG. 3. Optimized printing architecture 300 includes virtual computing device 302, physical computing device 304, printer server 308, and printer 306 communicatively coupled over network 150. Printer server 308 allows physical computing device 304 to communicatively couple to one or more printers 306. In some embodiments, printer server 308 is integrated with one or more printers 306.

Optimized printing architecture 300 improves the printing experience of users at remote locations by redirecting the printers 306 mapped on the physical computing device 304 back to the virtual computing device 302. For example, in some embodiments, optimized printing architecture 300 redirects the printers 306 using a Citrix ICA printer redirection policy or any other technology that supports this capability. Optimized printing architecture 300 leverages existing mapped printers 306 on a user's virtual computing device 302 by reading and exporting registry keys corresponding to the printers 306. Optimized printing architecture 300 then copies the registry keys and imports them on the physical computing device 304, which will show all of the printers 306, as-if mapped by the user.

Optimized printing architecture 300 is particularly effective for low-bandwidth scenarios between a physical computing device 304 and virtual computing device 302. In some embodiments, the virtual computing device 302 is hosted on server computing device 200. In some embodiments, physical computing device 304 is located in a remote office with local printers 306. In some embodiments, the physical computing device 304 is a locked down device (e.g., Windows 10 Lite) because the user does not have permissions to perform any actions. Optimized printing architecture 300 is particularly effective when users have limited or no access to make any modifications or changes to the physical computing devices 304 and/or printers 306 in this case. In some embodiments, users have access to printer configurations and registry keys on the virtual computing device 302.

Figure 4:
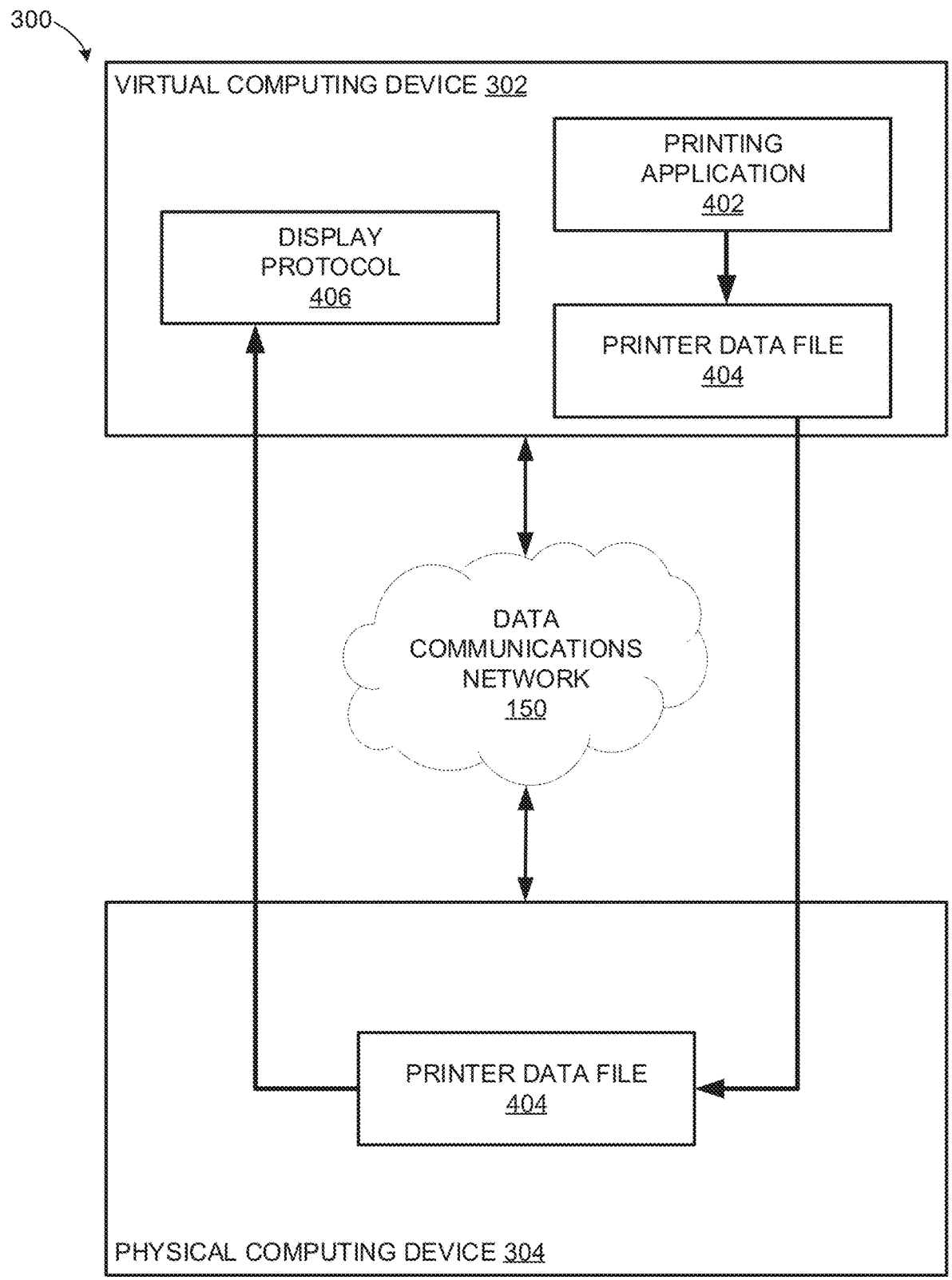
FIG. 4 is a diagram showing a visualization of an exemplary process for redirecting one or more printers from a virtual computing device to a physical computing device using the optimized printing architecture of FIG. 3, according to embodiments of the technology described herein.

An exemplary process for redirecting one or more printers 306 from a virtual computing device 302 to a physical computing device 304 using optimized printing architecture 300 is illustrated in FIG. 4. As shown, the process begins when a user triggers the printing application 402 deployed on the virtual computing device 302. The printing application 402 is configured to export all of the printer configurations from a registry hive on the virtual computing device 302 and save the printer configurations in a printer data file 404. The printing application 402 is also configured to copy the printer data file 404 remotely from the virtual computing device 302 to the physical computing device 304 and to remotely invoke the printer data file 404. Invoking the printer data file 404 results in all of the printer configurations imported to a registry hive on the physical computing device 304. Display protocol 406 is configured to redirect the newly mapped printers 306 on the physical computing device 304 back to the virtual computing device 302.

Figure 5:
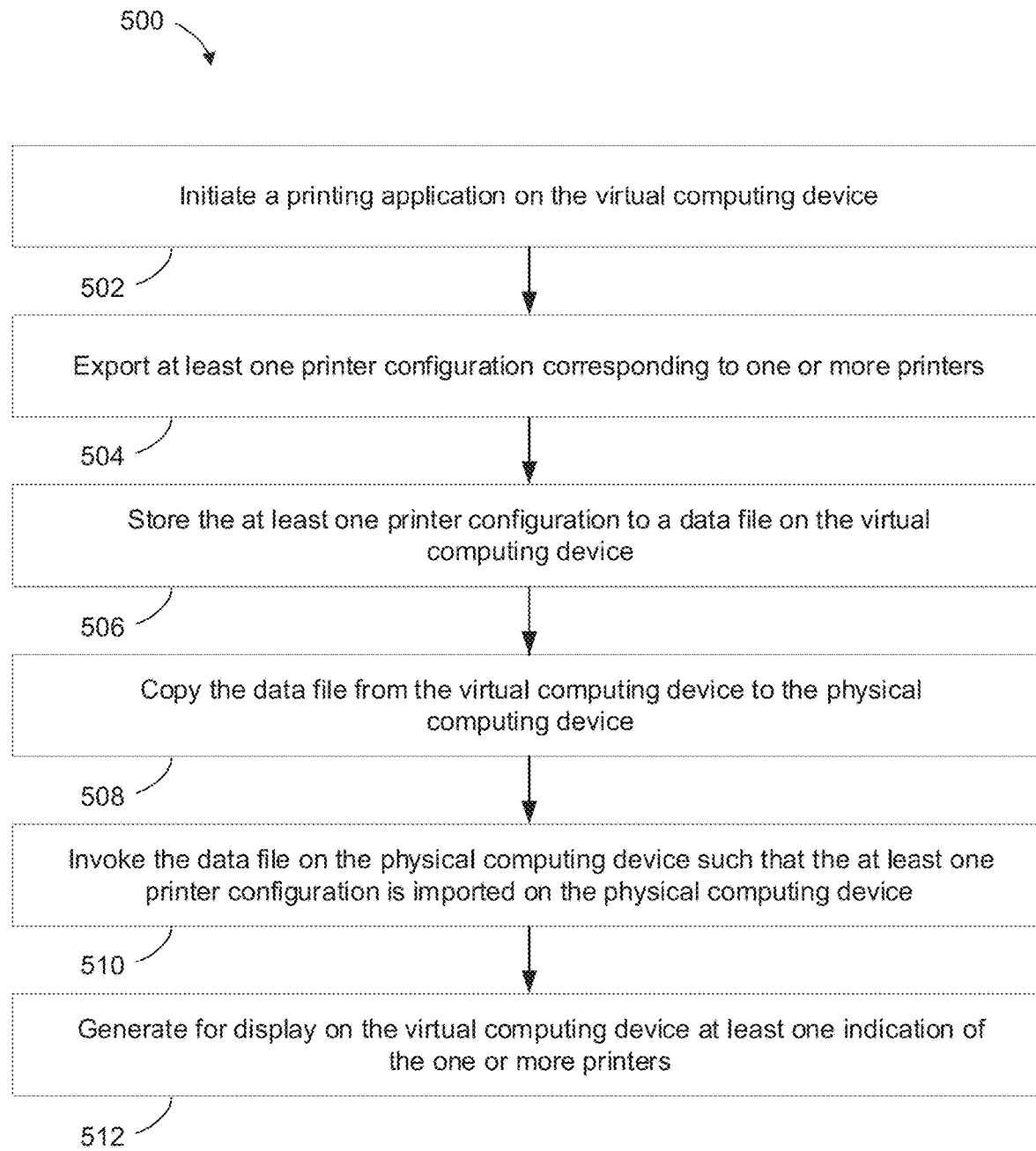
FIG. 5 is a flow diagram of a computer-implemented method for redirecting one or more printers from a virtual computing device to a physical computing device, according to embodiments of the technology described herein.

Referring to FIG. 5, a process 500 for redirecting one or more printers 306 from a virtual computing device 302 to a physical computing device 304 is illustrated. The process 500 begins by initiating a printing application 402 on a virtual computing device 302 in step 502. For example, in some embodiments, the virtual computing device 302 is configured to initiate the printing application 402 on the virtual computing device 302 in response to a user trigger.

Process 500 continues by exporting at least one printer configuration in step 504. The at least one printer configuration corresponds to one or more printers 306 communicatively coupled to a physical computing device 304. For example, in some embodiments, the at least one printer configuration includes one or more registry keys corresponding to the one or more printers 306 communicatively coupled to the physical computing device 304.

Process 500 continues by storing the at least one printer configuration to a data file 404 on the virtual computing device 302 in step 506. Process 500 continues by copying the data file 404 from the virtual computing device 302 to the physical computing device 304 in step 508. Process 500 continues by invoking the data file 404 on the physical computing device 304 such that the at least one printer configuration is imported on the physical computing device 304 in step 510.

Process 500 finishes by generating for display on the virtual computing device 302 at least one indication of the one or more printers 306 communicatively coupled to the physical computing device 304 in step 512. For example, in some embodiments, the virtual computing device 302 is configured to generate for display on the virtual computing device 302 the at least one indication of the one or more printers 306 using a display protocol 406. In some embodiments, the display protocol 406 is based on printer policies of the virtual computing device 302.

In some embodiments, the virtual computing device 302 is further configured to receive a print job corresponding to a printer of the one or more printers 306 communicatively coupled to the physical computing device 304. For example, in some embodiments, the print job is compressed on the virtual computing device 302. In some embodiments, the virtual computing device 302 is also configured to deliver the compressed print job from the virtual computing device 302. In some embodiments, the virtual computing device 302 is further configured to initiate the compressed print job on the physical computing device 304 using the imported printer configuration. For example, in some embodiments, a printer of the one or more printers 306 communicatively coupled to the physical computing device 304 completes the print job.

In some aspects, process 500 can be implemented on a system 300 for redirecting one or more printers 306 from a virtual computing device 302 to a physical computing device 304. The system includes a virtual computing device 302 communicatively coupled to a physical computing device 304 over a network 150. The virtual computing device 302 is configured to initiate a printing application 402 on the virtual computing device 302. The virtual computing device 302 is also configured to export at least one printer configuration. The at least one printer configuration corresponds to one or more printers 306 communicatively coupled to the physical computing device 304.

Further, the virtual computing device 302 is configured to store the at least one printer configuration to a data file on the virtual computing device 302. The virtual computing device 302 is also configured to copy the data file from the virtual computing device 302 to the physical computing device 304. Further, the virtual computing device 302 is configured to invoke the data file 404 on the physical computing device 304 such that the at least one printer configuration is imported on the physical computing device 304. The virtual computing device 302 is further configured to generate for display on the virtual computing device 302 at least one indication of the one or more printers 306 communicatively coupled to the physical computing device 304.

In some embodiments, the virtual computing device 302 is also configured to initiate the printing application 402 on the virtual computing device 302 in response to a user trigger. In other embodiments, the virtual computing device 302 is also configured to generate for display on the virtual computing device 302 the at least one indication of the one or more printers 306 using a display protocol 406. For example, in some embodiments, the display protocol 406 is based on printer policies of the virtual computing device 302. In other embodiments, the at least one printer configuration includes one or more registry keys corresponding to the one or more printers 306 communicatively coupled to the physical computing device 304.

In some embodiments, the virtual computing device 302 is further configured to receive a print job corresponding to a printer of the one or more printers 306 communicatively coupled to the physical computing device 304. For example, in some embodiments, the print job is compressed on the virtual computing device 302. In some embodiments, the virtual computing device 302 is also configured to deliver the compressed print job from the virtual computing device 302. In some embodiments, the virtual computing device 302 is further configured to initiate the compressed print job on the physical computing device 304 using the imported printer configuration. For example, in some embodiments, a printer of the one or more printers 306 communicatively coupled to the physical computing device 304 completes the print job.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for redirecting one or more printers from a virtual computing device to a physical computing device, the method comprising:
   initiating a printing application on a virtual computing device coupled to a physical computing device via a low-bandwidth network connection, wherein the physical computing device runs a lightweight operating system such that a user of the virtual computing device does not have permissions to perform any changes to the physical computing device, wherein the changes include modifying printer configurations on the physical computing device for one or more printers coupled to the physical computing device;
   exporting all of the printer configurations from a registry hive on the virtual computing device, wherein the printer configurations comprise registry keys corresponding to one or more printers communicatively coupled to the physical computing device;
   storing the printer configurations exported from the registry hive on the virtual computing device in a data file on the virtual computing device;
   copying the data file from the virtual computing device to the physical computing device;
   remotely invoking the data file on the physical computing device from the virtual computing device such that the printer configurations are imported from the data file to a registry hive on the physical computing device;
   generating for display on the virtual computing device at least one indication of the one or more printers communicatively coupled to the physical computing device; and
   redirecting the one or more printers communicatively coupled to the physical computing device back to the virtual computing device using the printer configurations imported to the registry hive on the physical computing device.

2. The computerized method of claim 1, further comprising initiating the printing application on the virtual computing device in response to a user trigger.

3. The computerized method of claim 1, further comprising generating for display on the virtual computing device the at least one indication of the one or more printers using a display protocol.

4. The computerized method of claim 3, wherein the display protocol is based on printer policies of the virtual computing device.

5. The computerized method of claim 1, further comprising receiving a print job corresponding to a printer of the one or more printers communicatively coupled to the physical computing device.

6. The computerized method of claim 5, wherein the print job is compressed on the virtual computing device.

7. The computerized method of claim 6, further comprising receiving the compressed print job from the virtual computing device.

8. The computerized method of claim 7, further comprising initiating the compressed print job on the physical computing device using the imported printer configuration.

9. The computerized method of claim 8, wherein a printer of the one or more printers communicatively coupled to the physical computing device completes the print job.

10. A system for redirecting one or more printers from a virtual computing device to a physical computing device, the system comprising:
    a virtual computing device communicatively coupled to a physical computing device over a network, the virtual computing device configured to:
       initiate a printing application on the virtual computing device coupled to a physical computing device via a low-bandwidth network connection, wherein the physical computing device runs a lightweight operating system such that a user of the virtual computing device does not have permissions to perform any changes to the physical computing device, wherein the changes include modifying printer configurations on the physical computing device for one or more printers coupled to the physical computing device;
       export all of the printer configurations from a registry hive on the virtual computing device, wherein the printer configurations comprise registry keys corresponding to one or more printers communicatively coupled to the physical computing device;
       store the printer configurations exported from the registry hive on the virtual computing device in a data file on the virtual computing device;
       copy the data file from the virtual computing device to the physical computing device;
       remotely invoke the data file on the physical computing device from the virtual computing device such that the printer configurations are imported from the data file to a registry hive on the physical computing device;
       generate for display on the virtual computing device at least one indication of the one or more printers communicatively coupled to the physical computing device; and
       redirect the one or more printers communicatively coupled to the physical computing device back to the virtual computing device using the printer configurations imported to the registry hive on the physical computing device.

11. The system of claim 10, wherein the virtual computing device is further configured to initiate the printing application on the virtual computing device in response to a user trigger.

12. The system of claim 10, wherein the virtual computing device is further configured to generate for display on the virtual computing device the at least one indication of the one or more printers using a display protocol.

13. The system of claim 12, wherein the display protocol is based on printer policies of the virtual computing device.

14. The system of claim 10, wherein the virtual computing device is further configured to receive a print job corresponding to a printer of the one or more printers communicatively coupled to the physical computing device.

15. The system of claim 14, wherein the print job is compressed on the virtual computing device.

16. The system of claim 15, wherein the virtual computing device is further configured to deliver the compressed print job from the virtual computing device.

17. The system of claim 16, wherein the virtual computing device is further configured to initiate the compressed print job on the physical computing device using the imported printer configuration.

18. The system of claim 17, wherein a printer of the one or more printers communicatively coupled to the physical computing device completes the print job.

\* \* \* \* \*